(12) United States Patent
Ye et al.

(10) Patent No.: US 9,269,167 B2
(45) Date of Patent: Feb. 23, 2016

(54) SPECT MOTION-CORRECTION (71) Applicant: KONINKLIJKE PHILIPS ELECTRONICS N.V., Eindhoven (NL)

(72) Inventors: Jinghan Ye, Cupertino, CA (US); Teimuraz Bandzava, San Jose, CA (US); Xiyun Song, Cupertino, CA (US)

(73) Assignee: KONINKLIJKE PHILIPS N.V., Eindhoven (NL)

(*) Notice: Subject to any disclaimer, the term of this patent is extended or adjusted under 35 U.S.C. 154(b) by 210 days.

(21) Appl. No.: 13/751,237

(22) Filed: Jan. 28, 2013

(65) Prior Publication Data

US 2014/0212011 A1 Jul. 31, 2014

(51) Int. Cl.
*G06T 11/00* (2006.01)
*G06T 5/00* (2006.01)

(52) U.S. Cl.
CPC ......... *G06T 11/005* (2013.01); *G06T 2211/412* (2013.01)

(58) Field of Classification Search
None
See application file for complete search history.

(56) References Cited

U.S. PATENT DOCUMENTS

| | | | |
|---|---|---|---|
| 5,287,276 A | 2/1994 | Crawford et al. | |
| 5,552,605 A * | 9/1996 | Arata | 250/363.04 |
| 6,740,883 B1 | 5/2004 | Stodilka et al. | |
| 6,841,782 B1 * | 1/2005 | Balan et al. | 250/363.02 |
| 7,138,633 B1 | 11/2006 | Rozsa et al. | |
| 7,542,597 B2 | 6/2009 | Rahn et al. | |
| 8,492,724 B2 | 7/2013 | Ronda et al. | |
| 2006/0133564 A1 * | 6/2006 | Langan et al. | 378/8 |
| 2007/0217568 A1 * | 9/2007 | Edic et al. | 378/4 |
| 2007/0268996 A1 * | 11/2007 | Hagiwara et al. | 378/4 |
| 2010/0072376 A1 | 3/2010 | Ronda | |
| 2010/0183203 A1 * | 7/2010 | Ye et al. | 382/128 |
| 2010/0207031 A1 | 8/2010 | Leppert | |
| 2012/0328173 A1 * | 12/2012 | Sachs et al. | 382/131 |
| 2013/0303884 A1 * | 11/2013 | Kuntz et al. | 600/417 |

FOREIGN PATENT DOCUMENTS

WO 2010015955 A2 2/2010

OTHER PUBLICATIONS

Kyme et al. "Practical Aspects of a Data-Driven Motion Correction Approach for Brain SPECT." IEEE Transactions on Medical Imaging, vol. 22, No. 6, Jun. 2003, pp. 722-729.*

* cited by examiner

*Primary Examiner* — Jon Chang (57) ABSTRACT

A nuclear camera acquires projections which are iteratively reconstructed by a reconstruction processor into an motion-artifacted image and stored in an image memory. The motion-artifacted image is forward-projected by a forward-projector to create forward-projections which are compensated for image degrading factors, such as resolution recovery, scatter and attenuation, and are compared with the acquired projections by a comparing unit to generate a motion-correction. A motion compensator operates on the acquired projections with the motion-correction to generate a motion-corrected projection data set in which each of the projections is in a common motion state. The motion-corrected projections are reconstructed into a motion-corrected image.

15 Claims, 8 Drawing Sheets

FIG. 8

SPECT MOTION-CORRECTION

BACKGROUND

The present application pertains to the diagnostic imaging arts. It finds particular application in conjunction with single photon emission computed tomography (SPECT) and will be described with particular reference thereto. It is to be appreciated, however, that it may also be applicable to other types of nuclear imaging, as well as other types of diagnostic imaging.

In SPECT imaging, a patient is injected with a radioactive tracer which breaks down to emit gamma rays of a characteristic energy. One or more SPECT detector heads are positioned adjacent the patient and rotated to a plurality of angular orientations. The data collected at each angular orientation represents projection data depicting the distribution of the radioactive tracer in the patient. These projections are then reconstructed into a three-dimensional diagnostic image.

A SPECT acquisition typically takes about 10 minutes or more to complete. During that time, the patient may move. Further, internal organs may also move during the imaging time. This motion, of course, causes motion-artifacts.

A commonly-used technique for motion-correction is described in U.S. Pat. No. 5,552,605. The projection data is first reconstructed into an image-artifacted three-dimensional image. The three-dimensional image is then forward-projected along each of the projection directions to generate a series of re-projections. The region of interest in each original projection and re-projection corresponding to the same angular orientation are compared and the original projections are shifted into alignment with the corresponding re-projection. The shifted original projections are reconstructed into a motion-correction 3D volume image. This process may be iteratively repeated to refine the motion-correction.

Although the technique of U.S. Pat. No. 5,552,605 has been used commercially for many years to generate motion-corrected SPECT images, there is room for improvement. Particularly, due to other degrading factors such as attenuation, scatter, system blurring, the shift amount even with the best match of the re-projection and the actually measured projection may not reflect the actual motion amount. In some cases, a significant artificial motion may be introduced which may compromise motion-correction success and accuracy.

The present application improves the motion-correction and accuracy by recognizing image degrading factors such as attenuation, scatter, and system resolution and considering them during iterative image reconstruction and motion-correction.

SUMMARY

In accordance with one aspect, a method of generating motion-corrected nuclear images is provided. A plurality of emission projections $P_0$ of a subject at each of a plurality of angular orientations or projection directions is acquired. The acquired projections $P_0$ are reconstructed into a motion-artifacted emission image $I_0$. The motion-artifacted emission image $I_0$ is forward-projected along each of a plurality of projection directions corresponding to the angular orientations or projection directions of the measured projections $P_0$ to generate a plurality of forward-projections $FP_0$. The acquired projections $P_0$ and forward-projections $FP_0$ corresponding to the same angular orientation are compared to generate a motion-correction vector $V_C$. The measured projections $P_0$ are motion-corrected with the motion-correction vector $V_C$ to form motion-corrected projections $P_C$ in a common motion state. The motion-corrected projections $P_C$ are reconstructed into a motion-corrected 3D image $I_1$.

In accordance with another aspect, a system for generating motion-corrected nuclear images is provided. One or more processors are programmed to perform the method as set forth in the preceding paragraph. A display unit displays the motion-corrected image $I_1$.

In accordance with another aspect, a system for generating motion-corrected nuclear images is provided. A reconstruction processor or engine reconstructs projections $P_0$ along each of a plurality of projection directions into an image $I_0$. An image memory stores the reconstructed image $I_0$. An iterative motion-correction processor or generator includes a forward-projector, a comparator, and a motion-correction processor or generator. The forward-projector forward-projects the reconstructed image $I_0$ from the image memory along the projection directions as a series of forward-projections $FP_0$. The comparator compares each forward-projection $FP_0$ with one of the projections $P_0$ along the same projection direction to generate a motion-correction $V_C$. The motion-correction processor or generator corrects each of the projections $P_0$ with the motion-correction vector $V_C$ to form motion-corrected projections $P_C$. The reconstruction processor or engine further reconstructs the motion-corrected projections $P_C$ into a motion-corrected image $I_1$ which is stored in the image memory.

One advantage resides in improved motion-correction.

Another advantage resides in an improved motion-correction success rate.

Another advantage resides in more accurate motion-corrected reconstructions.

Still further advantages of the present invention will be appreciated to those of ordinary skill in the art upon reading and understand the following detailed description.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

DETAILED DESCRIPTION

Figure 1:
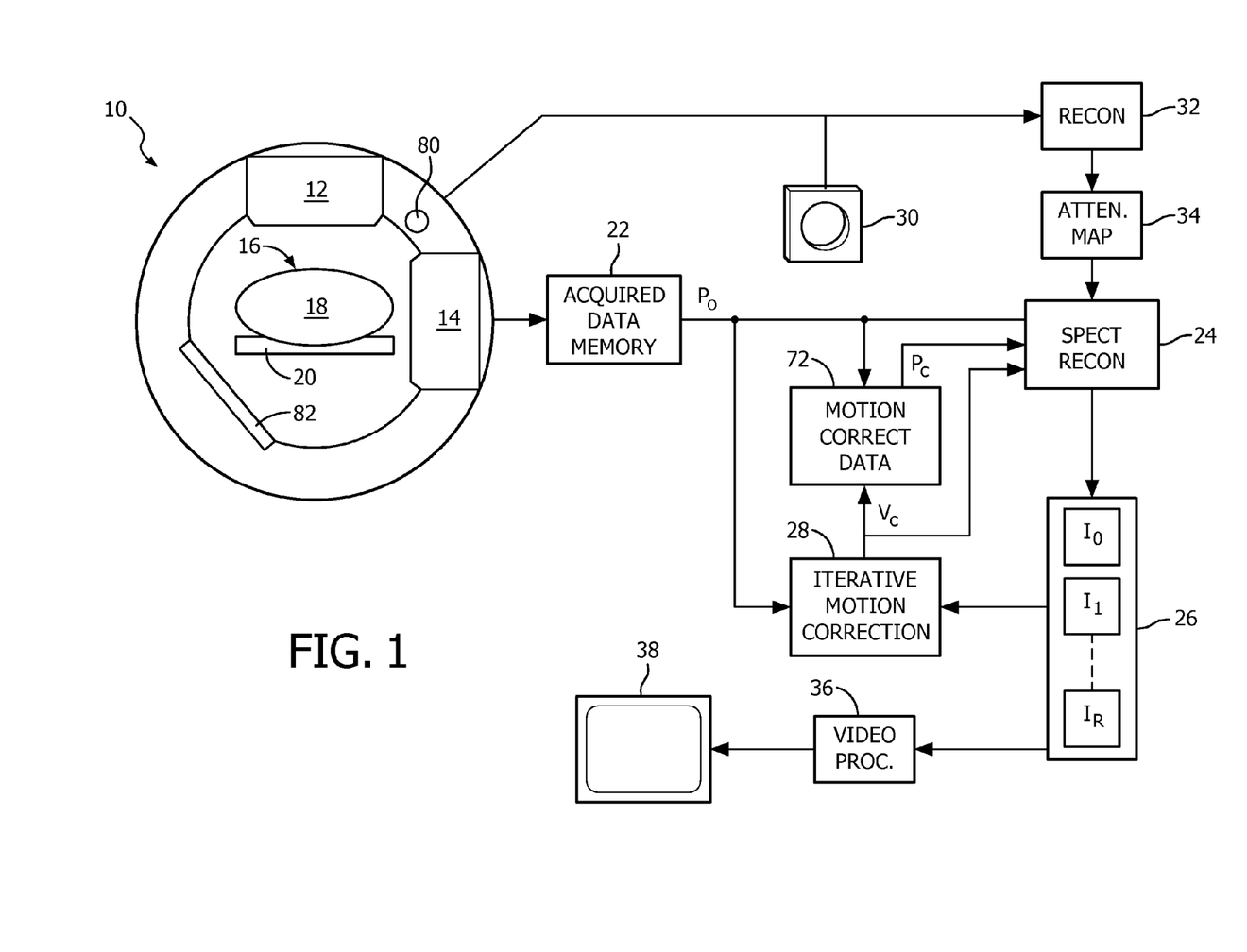
FIG. 1 is a diagrammatic illustration of a nuclear imaging system with improved motion-correction.

With reference to FIG. 1, a nuclear medical scanner, such as a SPECT scanner 10 includes a plurality of detector heads 12, 14. The detector heads are mounted for rotation around an examination region 16 in which a subject 18 is supported on a subject support 20. Data from the detector heads in each of a plurality of angular orientations, i.e., a projection $P_0$ at each of the angular orientations, is stored in an acquired data memory 22. In one embodiment, the memory 22 is a list-mode memory which stores each detected radiation event and its relative time of detection, e.g., the coordinates on the respective detector head at which it was detected, the angular orientation of the detector head and the detection time. In one embodiment, a motion state of the subject at the time of detection is also stored. In another embodiment, the memory stores the cumulative projection data for each of the angular orientations.

The acquired projections $P_0$ from the acquired data memory 22 are reconstructed with a reconstruction processor system 24 to generate a motion-artifacted image $I_0$ which is stored in a 3D nuclear image memory 26. The reconstruction processor 24 can perform iterative or non-iterative (analytical) reconstruction routines. An iterative motion-correction loop or processor system 28 uses the motion-artifacted image $I_0$ to generate a motion model or motion-correction vector $V_C$ which is used to correct the acquired projections $P_0$ into motion-corrected projections $P_C$. The motion-corrected projections $P_C$ are reconstructed by the iterative reconstruction processor system 24 to generate the first generation motion-corrected image $I_1$.

This process is iteratively repeated to refine the motion-correction. For example, the first generation motion-corrected image $I_1$ is used to generate a more accurate motion model for correcting the motion-artifacted projections $P_0$ for greater motion-correction accuracy. These further motion-corrected projections are reconstructed using the iterative reconstruction loop or processor system 24 into a second generation motion-corrected image $I_2$. This process is repeated for n-iterations, ultimately resulting in an n-th order motion-corrected image $I_n$.

An x-ray scanner 30, such as a CT scanner, generates radiation attenuation data which is reconstructed by a CT reconstruction processor 32 into an attenuation image or map. The attenuation image or map is stored in an attenuation map memory 34 for use by the iterative reconstruction loop or processor system 24 in making attenuation and scatter corrections. The attenuation correction map can be generated in a variety of ways. In one embodiment, the same patient support 20 is used in both the CT scanner 30 and the SPECT scanner 10 in order to move the patient therebetween without moving the patient and to maintain registration between the transmission and SPECT data. In another embodiment, a transmission radiation source 80 is disposed on the SPECT imaging system 10 across the examination region from a transmission radiation detector 82. In another embodiment, a radiation source of a different characteristic energy than the emission source is disposed across the examination region from one of the detector heads and the transmission data is collected concurrently with the emission SPECT data. Alternately, the transmission data can be collected in a separate transmission imaging scan preceding or following the SPECT imaging scan.

A video processor 36 is connected with the three-dimensional nuclear image memory for converting one or more of the motion-artifacted and motion-corrected images into appropriate format for display on a monitor 38.

Figure 2:
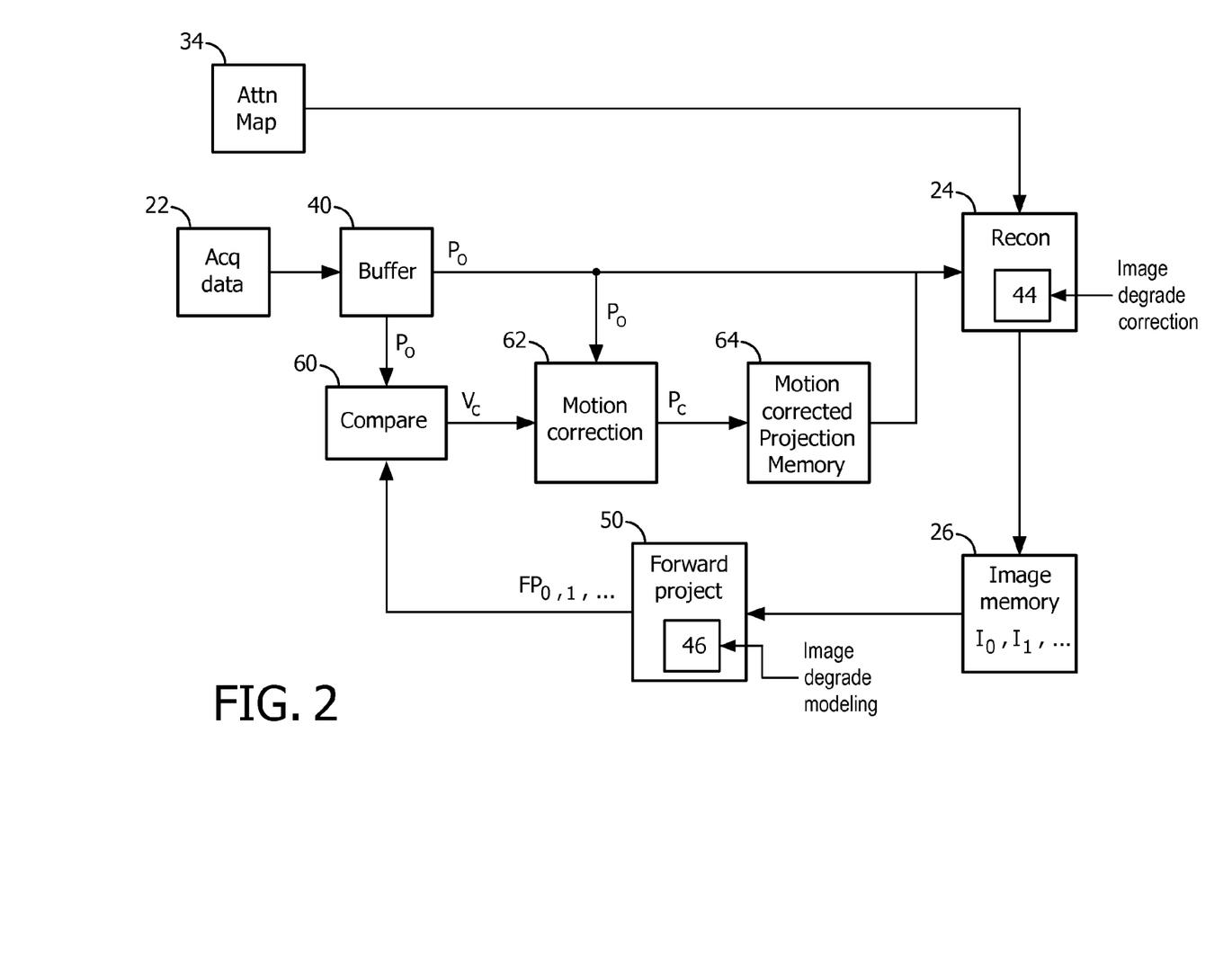
FIG. 2 is a more detailed illustration of one embodiment of the system.

With reference to FIG. 2, the reconstruction system 24 and the iterative motion-correction loop or system 28 can be made up of a plurality of engines which may take form in an appropriately programmed processor, an ASIC, one or more array processors, or other components as are known in the field, hereinafter collectively referenced as engines or means. These engines can, in part, be shared between an iterative reconstruction loop or system and the iterative motion-correction loop or system. For simplicity of explanation, the embodiment of FIG. 2 is based on a SPECT nuclear detector with two detector heads, e.g., detector heads 12, 14 which are offset at an angle relative to each other, e.g., 90°. However, it is to be understood that the following description is also applicable to SPECT scanners with a single detector head, three or more detector heads, or to PET scanners.

The pair of projections $P_0$ in the two head embodiment which were obtained concurrently from each of the detector heads 12, 14 are received in actual projection data buffer 40. All projections are passed to the reconstruction system 24. The projections are processed by a series of image degrading factor compensation processors or engines 44 which include one or more of a resolution recovery processor or engine which operates on each back-projection with a resolution recovery algorithm or routine, a scatter correction processor or engine which operates on each back-projection with a scatter correction algorithm or routine, such as an effective source scatter estimation (ESSE) routine, and an attenuation correction processor or engine which performs attenuation correction on each back-projection. Other image degrading factor compensations include noise reduction, enhancing edges, compensating for non-ideal image system behavior, and decay of radioactivity during data acquisition. Other suitable scatter corrections include second energy window scatter subtraction in the acquired projections, and convolving a scatter correction kernel using an estimated attenuation map. Other suitable attenuation corrections including applying the attenuation correction to the projection data or an estimated subject boundary (particularly with emission data). When an iterative reconstruction process is employed, the image degrading factors are modeled during forward-projection such that the image degrading factor corrections are not compounded. The system resolution corrected, scatter-corrected, and attenuation-corrected first motion-artifacted image $I_0$ is stored in the 3D image memory 26.

To perform an initial motion-correction, a temporally corresponding pair (or more if there are more than two detector heads) of actually acquired projections $P_0$ is loaded into the projection buffer 40. A forward-projector 50 forward-projects the motion-artifacted 3D image $I_0$ along the same angular orientations or projection directions as the pair of measured projections $P_0$ in the measured projection buffer 40 as forward-projections $FP_0$. The forward-projector 50 includes one or more image degrading factor modeling processors or generators 46, including one or more of a system resolution recovery modeling processors or engines, a scatter correction modeling processors or engines, and an attenuation correction modeling processors or engines. In this manner, the forward-projections are modeled to represent a closer simulation of the actually acquired projections $P_0$. One or more projection comparing processors or engines 60 compares the actually acquired projections $P_0$ and the image degrading factor modeled or corrected forward-projections $FP_0$ along the corresponding angular orientations to determine a relative motion model or shift indicative of the difference therebetween. The comparing operation is performed concurrently on all of the measured projections which were measured concurrently or in a common motion state such that the compared actually acquired projections and the simulations thereof, i.e., the forward-projections, represent components of the same motion state. The comparing of the acquired projections and the forward-projections can be based on the whole projection or only a subregion of interest, e.g., the heart, with other areas being ignored. The region of interest can be determined manually or automatically based on the projections or the reconstructed image.

In one embodiment, the comparator 60 compares each pair (in the two head embodiment) of concurrently acquired projections $P_0$ with the corresponding forward-projections $FP_0$ to create a shift vector or motion model $V_C$. Because the projection direction or orientation of the two detector heads is offset, e.g., by 90°, the shift vector or motion model can be calculated in three dimensions.

In another embodiment in which the motion is cyclic, projections along a plurality of orientations or directions in the same motion state are compared with their corresponding forward-projections to create the shift vector or motion model in three dimensions. The shift vectors of such cyclic motion can further be used to generate a more complex motion model.

A shift or motion compensation processor or engine 62 adjusts each of the measured projections $P_0$ in accordance with the comparison, i.e., the modeled motion $V_C$, to generate motion-corrected projections $P_C$. For example, each projection $P_0$ is shifted in accordance with the determined shift vector.

The motion-corrected projections $P_C$ are stored in a motion-corrected projection memory 64. This process is repeated for the projections acquired at each pair of orientations of the detector heads to acquire a full set of motion-corrected projections $P_C$.

The reconstruction processor or engine 24 reconstructs the motion-corrected measured projections $P_C$ acquired over all the orientations assumed by the detector heads into the image memory 26 to generate a first motion-corrected image $I_1$.

In one embodiment, the motion-correction process is repeated based on the first motion-corrected SPECT image $I_1$ instead of the uncorrected image $I_0$. That is, the motion-correction vector or model $V_C$ which models the actually acquired projections $P_0$ is refined by forward-projecting with image degrading factor modeling the first motion-corrected 3D image $I_1$ image from memory 26 and using the comparators 60, comparing the forward-projections $FP_1$ with the corresponding actually acquired projections $P_0$ to refine the motion model or shift vector $V_C$ applied by the motion compensation or shift processor or generator 62. The improved motion-correction projections are reconstructed by the reconstruction processor 24 into a second motion-corrected 3D image $I_2$ in the image memory 26. This process can be iteratively repeated to generate a third motion-corrected image $I_3$, etc.

It is to be appreciated that in the foregoing system, the various described processing steps can be performed on a single computer or processor, or on a plurality of computers and processors. If a plurality of computers or processors is utilized, the processing functions may be divided as described above or may be shared among the processors or computers in other ways. Similarly, some or all of the above-described memories can be part of a single memory. Further, the one or more processors or computers are programmed with one or more programs to perform the above-described functions. The programs may be carried on a non-transitory computer-readable medium, such as a DVD, CD, memory stick, hard drive, or the like.

Figure 3:
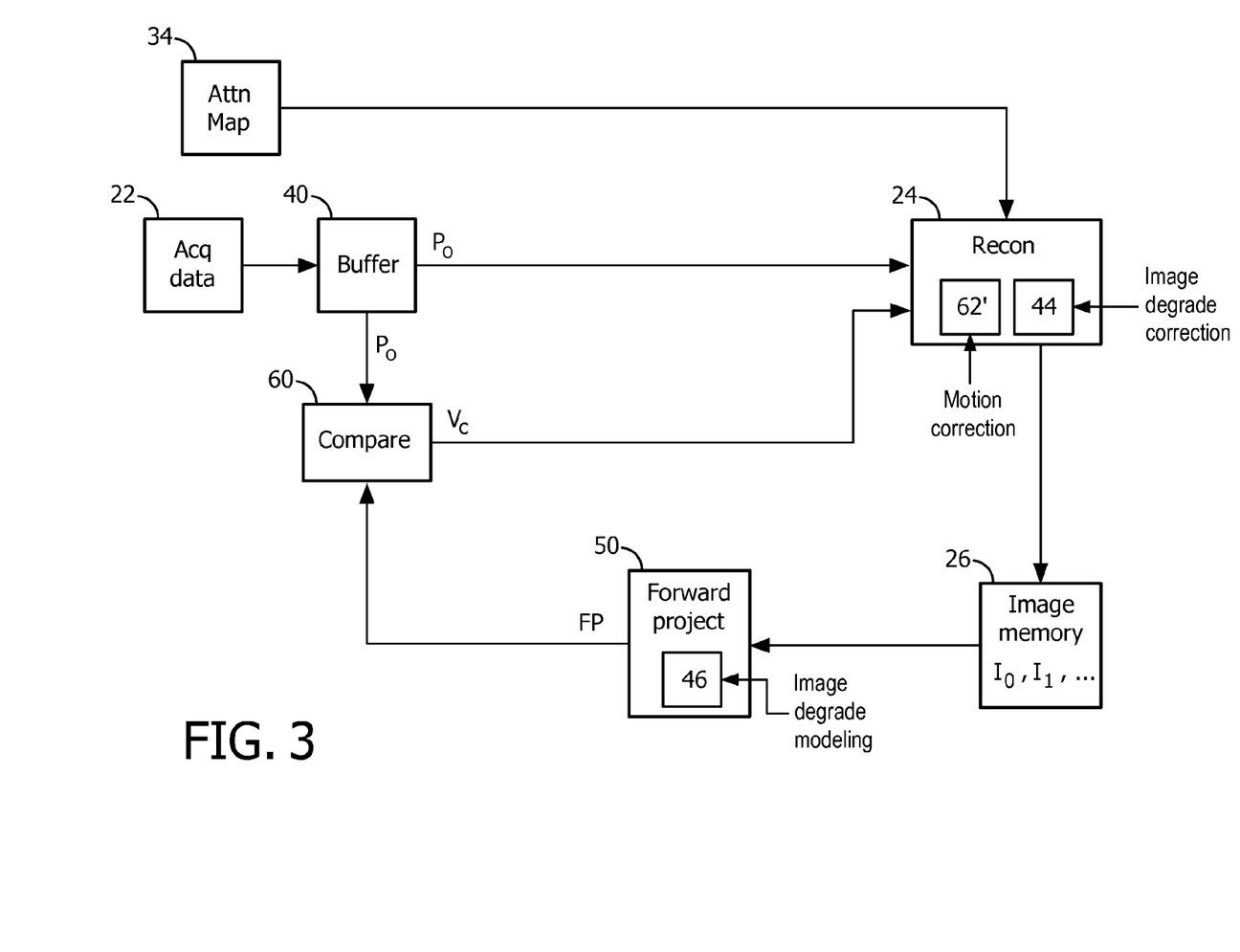
FIG. 3 is a more detailed illustration of another embodiment of the system.

In the embodiment illustrated in FIG. 3, like or analogous components with the components of FIG. 2 are described with the same reference number. In this embodiment, the image degradation modeled forward-projections FP are again compared with the corresponding actual projections $P_0$ by the comparing processor or generator 60 to generate the shift vector or motion model $V_C$. In this embodiment, the reconstruction processor 24 includes the image degrading factor compensation generators or processors 44, as well as a motion-correction engine or processor 62 which models or motion-corrects the actual projections $P_0$ during and as part of the image reconstruction process performed by the reconstruction processor system 24. In this embodiment, like the embodiment of FIG. 2, the motion correction process is iteratively repeated by generating an initial image $I_0$ which is forward-projected to generate image degrading modeled forward-projections which are compared to the actual projections to generate the motion-model or vector $V_C$. The actual forward-projections $P_0$ are reconstructed again using the motion-modeling to generate the first motion-corrected image $I_1$. This process is iteratively repeated to generate successively more accurately motion-corrected images $I_2$, etc.

Figure 4:
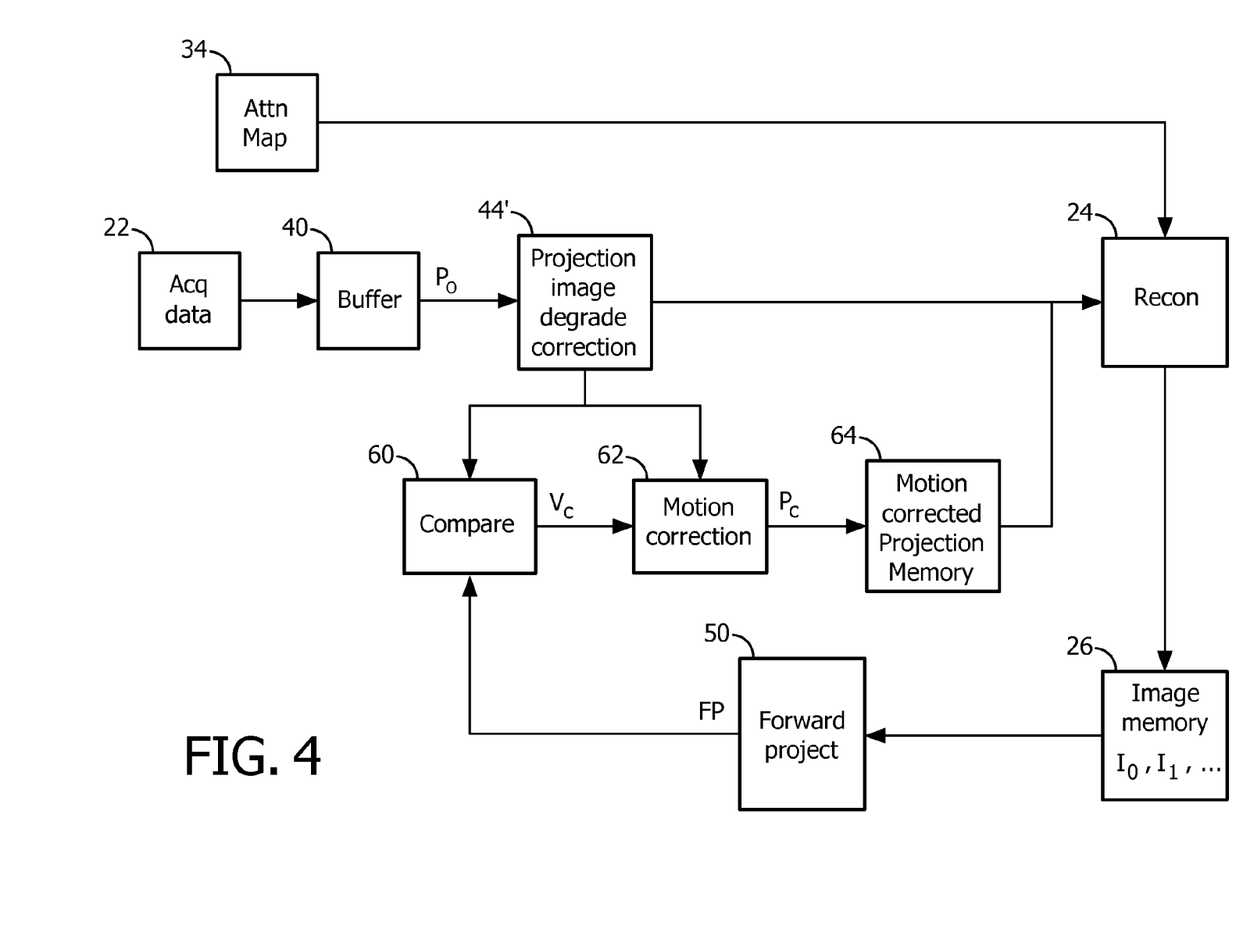
FIG. 4 is a more detailed illustration of yet another embodiment of the system.

In the embodiment of FIG. 4, like and analogous components are again labeled with the same reference number. A projection image degradation correction processor or engine 44' performs one or more of the resolution recovery, scatter correction, and attenuation correction but directly on each actually acquired projection $P_0$. The image reconstruction processor 24 reconstructs the image degrading factor corrected projections into the initial, motion-artifacted image $I_0$ which is again stored in the image memory 26. The forward-projector forward projects the initial image to create a series of forward-projections FP which are compared with the image degrading factor corrected projections by the comparing processor or engine 60. Because the forward-projections are being compared with the degradation factor corrected projections, the forward-projector 50 does not need to model the image degrading factors. The comparing processor or generator 60 again generates a motion model or vector $V_C$ which, in the embodiment illustrated in FIG. 4, is used by a motion-correction processor or engine 62 to generate a set of motion and degrading factor corrected projections which are stored or buffered in a motion and degrading factor corrected projection memory 64 before being reconstructed by the reconstruction processor 24 into the first motion-corrected image $I_1$. Again, this process is iteratively repeated to generate further refined motion-corrected images $I_2$, etc.

Figure 5:
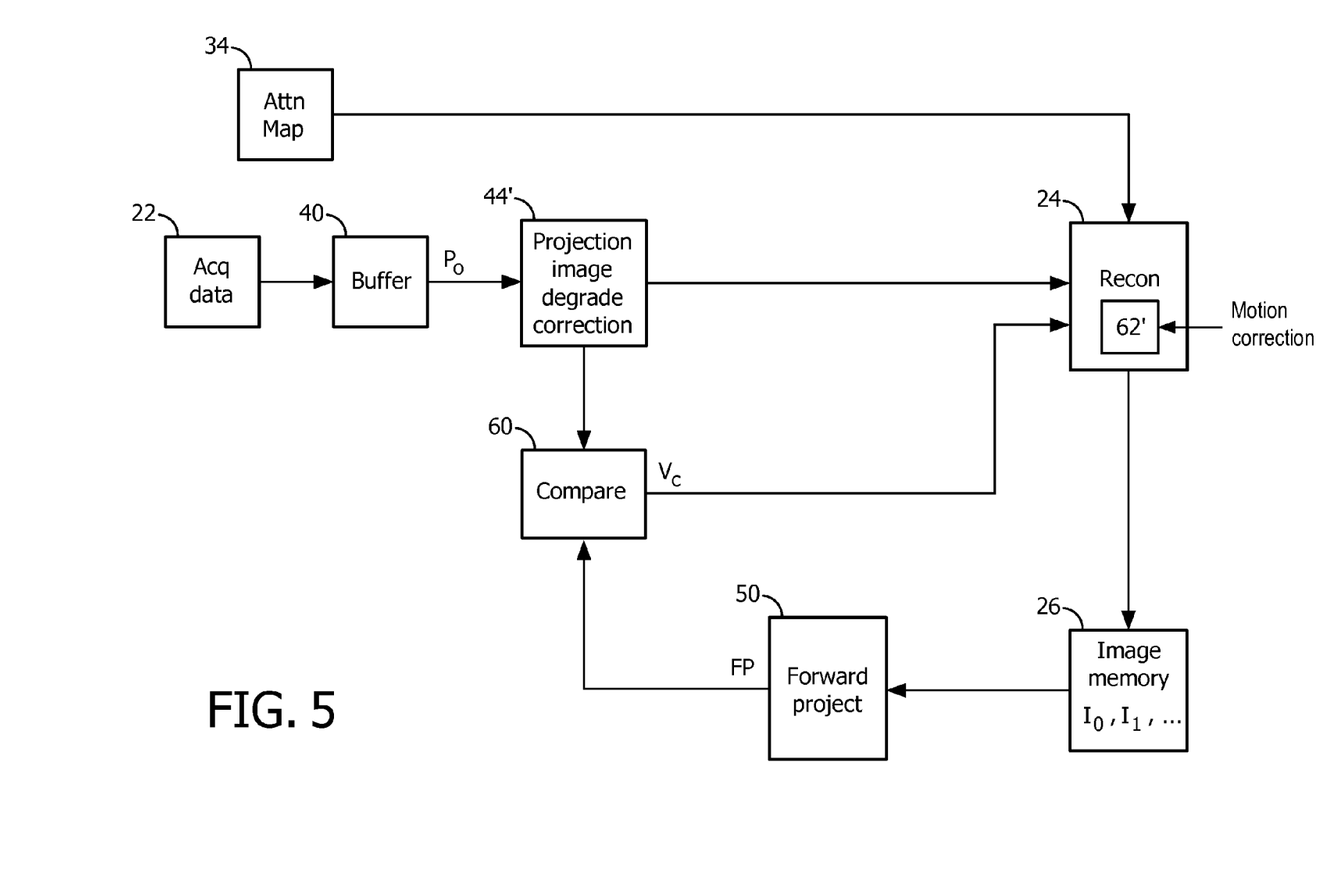
FIG. 5 is a more detailed illustration of yet another embodiment of the system.

In the embodiment of FIG. 5, analogous to the embodiment of FIG. 3, the motion model or vector $V_C$ is supplied directly to the reconstruction processor which includes a motion correction routine or engine 62' as an integral part of the reconstruction. The actual projections $P_0$ are corrected for image degrading factors 44' and reconstructed by the reconstruction processor or engine 24 into the motion-artifacted image $I_0$. The motion-artifacted image $I_0$ is forward-projected 50 and compared 60 with the image degrading factor corrected projections to generate the motion model or vector $V_C$. The image degrading factor corrected projections are reconstructed again undergoing motion-correction based on the motion model or vector $V_C$ to generate the first motion-corrected image $I_1$. This process can be repeated based on $I_1$ to refine the motion model or vector $V_C$ to generate improved motion-corrected images $I_2$, etc.

Figure 6:
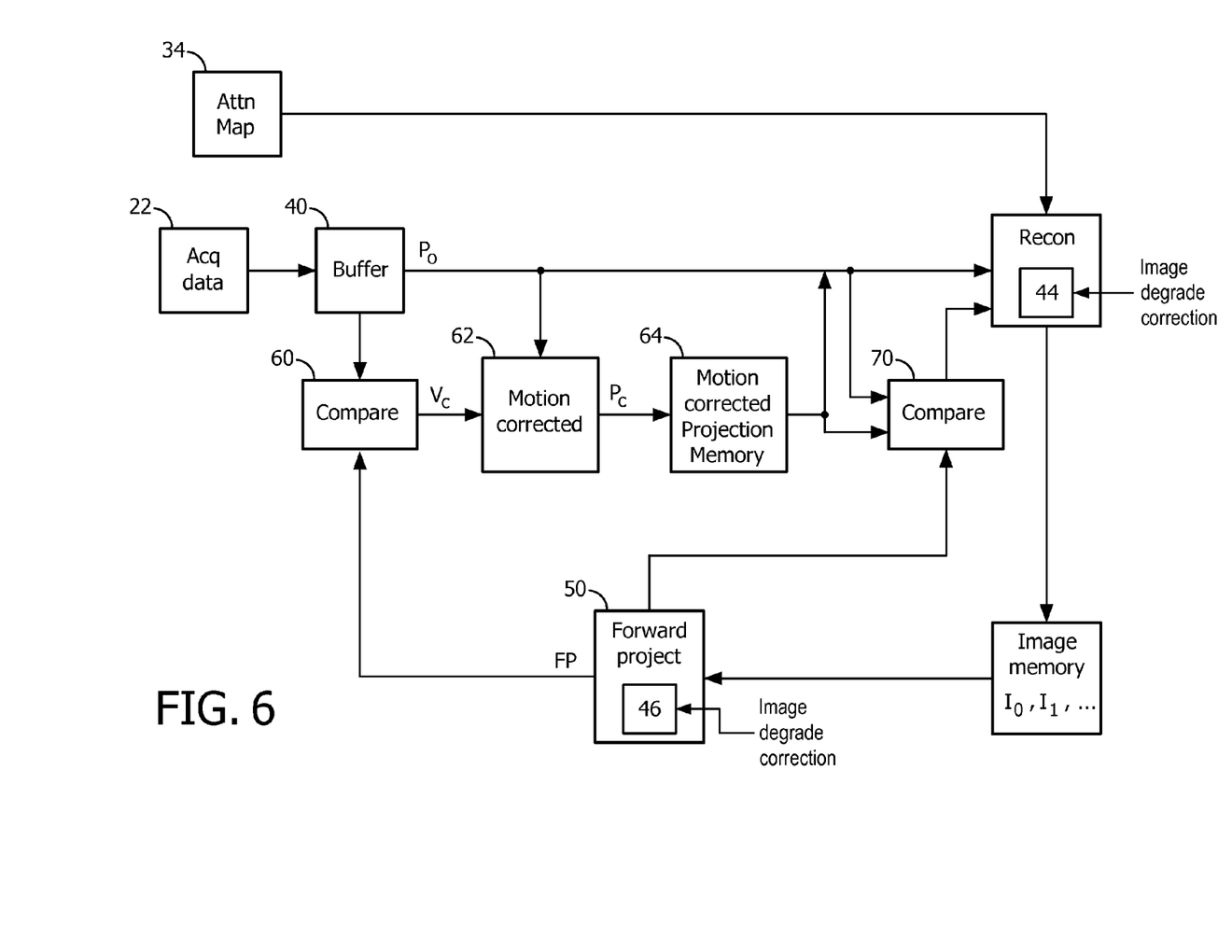
FIG. 6 is a more detailed illustration of yet another embodiment of the system.
Figure 7:
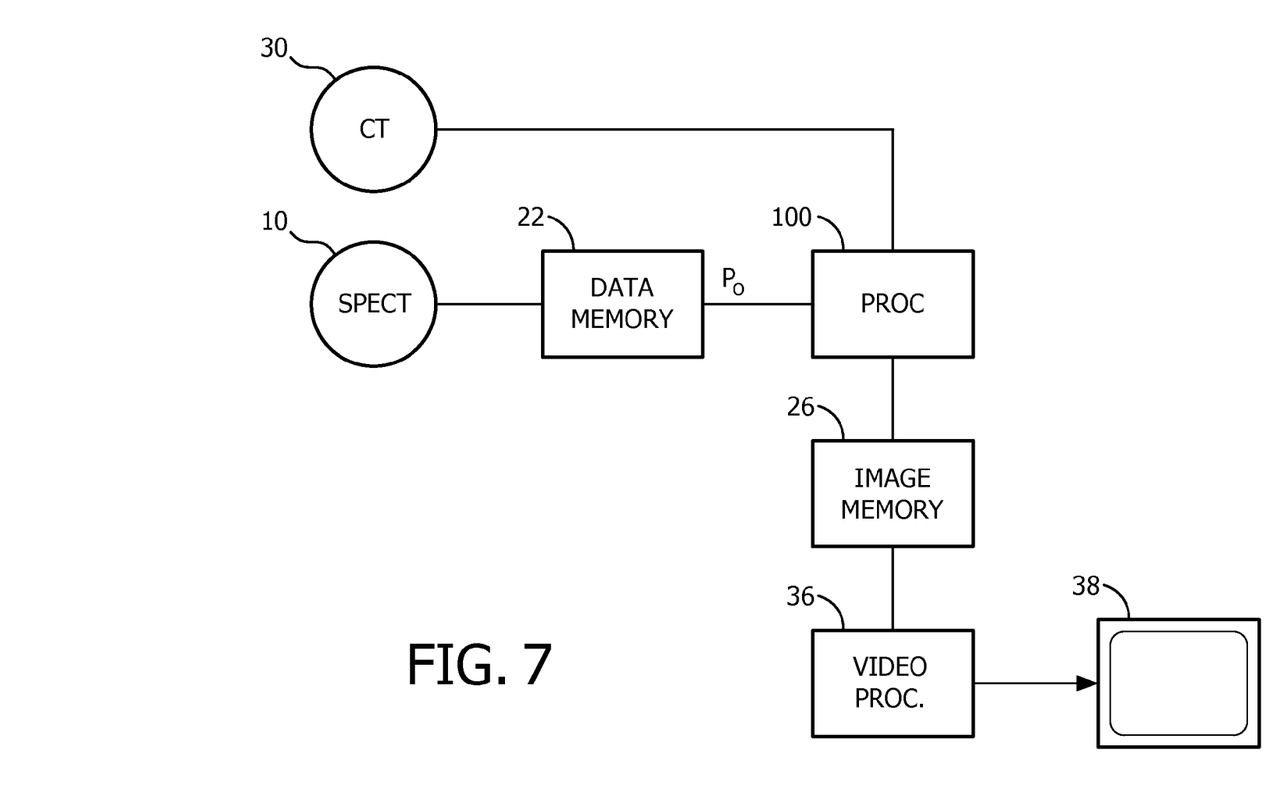
FIG. 7 is a more detailed illustration of still another embodiment of the system.

The reconstruction processor or generator 24 in any of the foregoing embodiments can be an iterative reconstruction processor. Looking to FIG. 6, which is based on the embodiment of FIG. 2, an iterative reconstruction technique, such as a maximum likelihood expectation maximum (MLEM), or an ordered subset expectation maximization (OSEM) algorithm, or the like, iteratively reconstructs the data. To iteratively reconstruct the motion-artifacted image $I_0$, the forward-projector 50 forward-projects an initial image along each of the same directions as the projections $P_0$. A comparator 70 compares the corresponding forward-projections and actual projections to determine a deviation therebetween. The deviations or errors are back-projected by the reconstruction processor into the image memory 26 to correct the initial motion-artifacted image. This reconstruction is iteratively repeated until the motion-artifacted image $I_0$ converges within preselected criteria. The first motion-corrected image $I_1$ and the subsequent motion-corrected images $I_2$, etc. are iteratively reconstructed analogously. The reconstruction, analogously, can be performed with the embodiments of FIGS. 3-5. With reference to FIG. 7, the projections $P_0$ from the acquired data memory 22 are processed by one or more processors 100 which process the projections to perform the method described above in conjunction with FIGS. 1-6 or below in conjunction with FIG. 8 to generate the motion-artifacted image $I_0$ and one or more motion-corrected images $I_1, I_2, \ldots$, etc. which are stored in the image memory 26. The motion-corrected images are displayed on the display unit 38.

Figure 8:
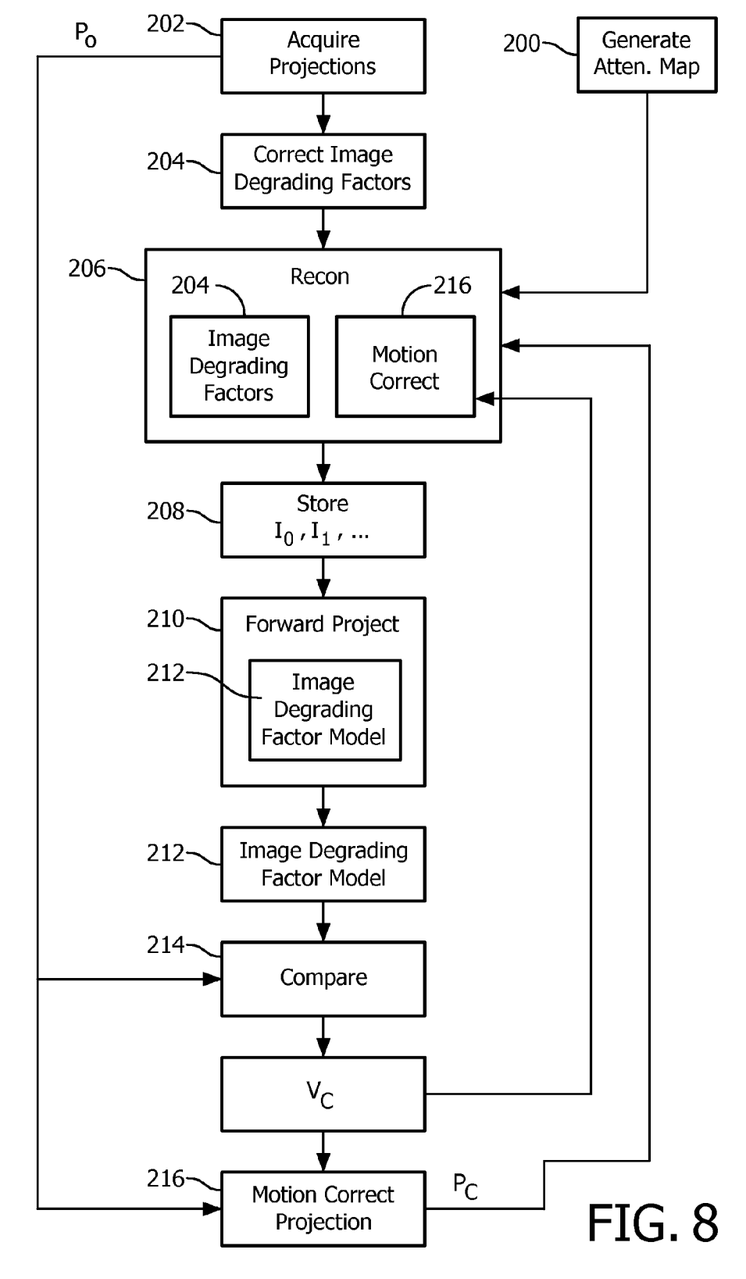
FIG. 8 illustrates a method of producing SPECT images with improved motion-correction.

With reference to FIG. 8, a 3D attenuation map is generated 200 using a CT scanner 30, the transmission radiation source 80 on a SPECT imaging system 10, an MR image, or the like. Contemporaneously, SPECT projections are measured 202 to generate a plurality of SPECT projections $P_0$ along each of a plurality of angular orientations. The measured projections are corrected for image degrading factors at step 204. The correction for image degrading factors includes resolution recovery, scatter correction, and attenuation correction. The attenuation correction is performed using the attenuation map. The full set of measured SPECT projections $P_0$ are reconstructed 206 into a 3D motion-artifacted image $I_0$ which is stored at 208. The correction for image degrading factors 204 in one embodiment is performed on the measured projections $P_0$ and in another embodiment is incorporated into the reconstruction 206. The image reconstruction in one embodiment is iterative and in another embodiment is non-iterative, e.g. analytical.

The motion-artifacted image $I_0$ is forward-projected 210 along each of the angular projections or projection directions of the acquired projections $P_0$ and processed for step image degrading factor modeling 212, either during the forward-projection or down-stream from the forward-projecting step. The image degrading factor modeling again includes resolution recovery, scatter correction, and attenuation correction. In a multi-head SPECT scanner in which a plurality of SPECT projections of a region of interest of the subject 18 are acquired concurrently. The concurrently acquired SPECT projections are each compared 214 with an image degrading factor modeled forward-projection $FP_0$ along the same angular orientation to generate a motion model or vector $V_C$. Each of the measured SPECT projections $P_0$ are then motion-corrected 216 with the motion model to create motion-corrected measured SPECT projections $P_C$. The motion-corrected measured SPECT projections are reconstructed 206 to form a first iteration motion-corrected image $I_1$ which is stored 208. The motion model $V_C$ can be applied to the acquired projections $P_0$ to create motion-corrected projections Pc which are reconstructed. Alternately, the motion model or vector $V_C$ is applied as a part of the reconstruction step 206.

The motion-correction can be refined by forward-projecting 210 the first iteration motion-corrected image $I_1$, modeling the forward-projections for the degrading factor correction 212, comparing or motion-modeling 214 the image degrading factor modeled forward-projection FP with the corresponding acquired SPECT projection $P_0$ to refine the motion model $V_C$. The projections are corrected 216 with the refined motion model and reconstructed 206. The motion-correction can be iteratively performed until motion-correction accuracy within a preselected threshold is achieved.

Although described with particular reference to SPECT imaging, it is to be appreciated that this technique is applicable to other imaging modalities. For imaging modalities that do not generate projection data directly, the data can be reconstructed in other manners to generate the motion-artifacted image which is then used as described above to apply the iterative motion correction. For example, in PET imaging, PET data from one or more temporal segments is reconstructed using any PET reconstruction technique to generate the motion-artifacted image $I_0$. The motion-artifacted image is forward-projected and the forward-projections are normalized in accordance with the duration of the temporal segment. The normalized forward-projections are compared with the temporal segment to determine a motion vector that is associated with the patient motion during the temporal segment.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A method of generating motion-corrected images comprising:
   acquiring a plurality of acquired projections of a subject in an examination region at each of a plurality of angular orientations;
   reconstructing and image degrading factor correcting the acquired projections into a motion-artifacted, image degrading factor corrected image;
   forward-projecting and image degrading factor modeling the motion-artifacted, image degrading factor corrected image along each of a plurality of projection directions corresponding to the angular orientations of the measured projections to generate a plurality of image degrading factor modeled forward-projections;
   comparing the acquired projections and the image degrading factor modeled forward-projections corresponding to the same angular orientation to generate a patient motion correction vector;
   applying the patient motion correction vector to the acquired projections to form motion-corrected projections in a common motion state;
   reconstructing and image degrading factor correcting the motion-corrected acquired projections into a motion-corrected, image degrading factor corrected image.

2. The method according to claim 1, wherein the image degrading factor correcting is integrated with the reconstructing steps.

3. The method according to claim 1, wherein the image degrading factor correcting includes attenuation correcting and includes:
   using a 3D attenuation map of the subject in the examination region to perform the attenuation correcting.

4. The method according to claim 1, wherein the image degrading factor correcting step includes at least one of:
   compensating for radioisotope decay;
   recovering resolution;
   compensating for scatter; and
   compensating non-ideal imaging system behavior.

5. The method according to claim 1, wherein image degrading factor correcting includes:
   convolving a 3D scatter kernel with an attenuation map;

during each reconstructing step, operating on the acquired and motion corrected projections with the result of convolving 3D scatter kernel and attenuation map.

6. The method according to claim 1, further including:
forward-projecting the motion-corrected image to generate motion-corrected forward-projections;
motion-correcting the acquired projections;
comparing each of the motion-corrected forward-projections with the motion-corrected acquired projection along the corresponding angular orientation to refine the motion correction.

7. A non-transitory computer medium carrying software which controls one or more processors to perform the method according to claim 1.

8. A processor programmed to perform the method according to claim 1.

9. A system for generating motion-corrected nuclear images comprising:
one or more processors programmed to perform the method according to claim 1;
a display unit which displays at least a portion of the motion-corrected image.

10. A system for generating motion-corrected images comprising:
a reconstruction processor or engine configured to reconstruct projections along each of a plurality of projection directions into a reconstructed image;
at least one image degrading factor compensating processor or engine configured to compensate for image degrading factors, the at least one image degrading factor compensating processor or engine being included in the reconstruction processor or engine, such that the reconstructed image is image degrading factor compensated;
an image memory configured to store the image degrading factor compensated reconstructed image;
a motion correction processor or generator including:
a forward-projector configured to forward-project the image degrading factor compensated reconstructed image from the image memory along the projection directions as a series of forward-projections,
an image degrading factor modeling processor downstream from or integral with the forward-projector configured to model the forward-projections for the image degrading factors,
a comparator configured to compare each forward-projection with one of the projections, wherein the forward-projection and the projection are in a common projection direction to generate a motion correction,
a projection correction processor or generator configured to correct each of the projections with the motion correction to form motion-corrected projections;
wherein the reconstruction processor or engine and the image degrading factor processor or engine are configured to reconstruct and image degrading factor compensate the motion-corrected projections into a motion-corrected image degrading factor compensated image configured to be stored in the image memory.

11. The system according to claim 10, wherein the image degrading factors include resolution recovery, scatter correction, image noise reduction, compensation for non-ideal system behavior, and decay of radioactivity during data acquisition.

12. The system according to claim 10, wherein the reconstruction processor includes the motion correction processor or generator such that the motion correction is modeled during the reconstruction of the projections.

13. The system according to claim 10, wherein the reconstruction processor or engine and the motion correction processor or generator are configured to iteratively correct for motion to generate at least a first generation motion-corrected image degrading factor compensated image and a second motion-corrected image degrading factor compensated image.

14. The system according to claim 10, wherein the image degrading factor modeling processor models the forward-projections to simulate the acquired scatter artifacted nuclear projections.

15. A system for generating motion corrected nuclear images, the system comprising:
a projection memory configured to store acquired scatter artifacted nuclear projections;
an image memory configured to store reconstructed images;
one or more processors configured to:
receive the acquired scatter artifacted nuclear projections from the projection memory,
correct the acquired scatter artifacted nuclear projections with a motion model or vector to create scatter corrected nuclear projections,
reconstruct the scatter corrected nuclear projections into a scatter corrected image,
forward project and scatter model the scatter corrected image to generate scatter artifact modeled forward projections which simulate the acquired scatter artifacted nuclear projections,
refine the motion model or vector based on a comparison of the generated scatter artifact modeled forward projection and the acquired scatter artifacted nuclear projections.

* * * * *